United States Patent [19]

Guzik et al.

[11] Patent Number: 4,902,971
[45] Date of Patent: Feb. 20, 1990

[54] MAGNETIC HEAD AND DISC TESTER EMPLOYING PIVOT ARM ON LINEARLY MOVABLE SLIDE

[75] Inventors: Nahum Guzik, Mountain View; Vinod K. Rao, Fremont, both of Calif.

[73] Assignee: Guzik Technical Enterprises, Inc., San Jose, Calif.

[21] Appl. No.: 244,718

[22] Filed: Sep. 14, 1988

[51] Int. Cl.$^4$ .................... G01R 33/12; G01R 31/00; G11B 5/55; G11B 21/08
[52] U.S. Cl. .................................. 324/212; 360/106; 369/223
[58] Field of Search ................ 324/210, 212; 360/106, 360/31; 369/223

[56] References Cited

U.S. PATENT DOCUMENTS 2,922,106  1/1960  Oates et al. ..................... 324/212
3,478,262  11/1969  Vigil ................................ 324/212

FOREIGN PATENT DOCUMENTS 0283877  12/1986  Japan ............................... 324/212

Primary Examiner—Gerard R. Strecker
Attorney, Agent, or Firm—David Pressman

[57] ABSTRACT

A magnetic head and disc tester imitates motions of the head on a hard disc drive and comprises a stationary base (22), a slide mechanism (24) which can be installed in any required position on the base (22) with respect to a center of rotation of a magnetic disc (D). The disc (D) is rotatingly supported by a spindle unit (42) fixed to the stationary base (22). A magnetic head (52) to be tested is attached to the end of an arm (16) which is pivotally supported on a slide (36) of the slide mechanism. The angular position of the longitudinal axis of the magnetic disc with respect to a tangent to a given track of magnetic disc (52), i.e., a skew angle, can be adjusted and the head can be fixed in the adjusted position. For measuring the parameters of the head or the disc, the slide (36) is moved linearly and carries the magnetic head over the disc in a linear direction, the head being installed at a required skew angle by means of the above-mentioned angular adjustment. Thus, instead of rotary motion of the head with respect to the disc tracks, it is moved linearly, but maintains the same skew angle as on the disc drive. Although this approximation produces some tracking error, it is negligible, and the tester has a simpler construction and universal applicability.

20 Claims, 3 Drawing Sheets

MAGNETIC HEAD AND DISC TESTER EMPLOYING PIVOT ARM ON LINEARLY MOVABLE SLIDE

BACKGROUND

1. Field of the Invention

The present invention relates to magnetic recording, particularly to a magnetic head and disc tester.

2. Description of Prior Art

Prior to description of the invention and for better understanding of terminology used in the specification, it will be helpful to explain the structure of a typical head and disc tester and a testing procedure.

The main purpose of a head and disc tester is to measure the parameters of a magnetic head or a disc; the tester should simulate the motions of the head with respect to the disc which occur in an actual hard-disc drive.

A typical prior-art head and disc tester is shown schematically at 20 in FIG. 1. It has a housing 10 which supports a rotating spindle 12 which in turn supports a hard magnetic disc 14. An arm 16 carries a magnetic head 18 and a drive mechanism (not shown) for moving magnetic head 18 with respect to disc 14. As shown, head 18 and arm 16 are both elongated and have aligned longitudinal axes.

Disc 14 has an outer track OD and an inner track ID; these tracks are not visible on an actual disc since they are invisible magnetic patterns on a magnetic medium. Arm 16 moves head 18 between track ID and track OD.

Depending on the type of a drive unit used, known head and disc testers can be divided into three categories: (1) Testers in which arm 16 has a pivot point which is fixed with respect to the center of disc 14 and a fixed length from the pivot to the magnetic head. Such devices are custom-made, are not adjustable, and are intended only for a specific design. (2) Testers in which the movement of the head with respect to the disc is controlled by a cam. For simulating different types of disc drives, one must replace the cam. (3) Testers in which the head is positioned with respect to the disc by an X-Y manipulator.

In order to understand the difference between these three types of head and disc testers, it is necessary to define "skew angle".

Let us consider, e.g., the case of the tester of category (1), i.e., an non-adjustable tester with a fixed pivot point.

Arm 16 is shown in FIG. 1 as tangent to track ID. In the course of testing the tracks, arm 16 pivots about its pivot point, so that head 18 moves along a curved path from track ID to track OD. The position of head 18 at track OD is shown by broken lines. It can be seen that in this position, arm 16 and the longitudinal axis of head 18 are not tangent to track OD, but rather forms an angle $A_{OD}$ with respect to the tangent. This angle is called a skew or a tracking error angle. In the example illustrated, skew angle $A_{ID}$ is zero, but this is shown only for simplicity of explanation; $A_{ID}$ can have actual values as well as zero.

A disc drive manufacturer usually wants a tester to imitate the head's motions in the same manner as they occur in the disc drive. Actual disc drives usually have definite skew angles $A_{ID}$ and $A_{OD}$, and these skew angles are used as input data for the tester. From this viewpoint, the testers of category (1) are suitable only for fixed skew angles $A_{ID}$ and $A_{OD}$ and cannot be used for even slightly changed values of these angles.

The testers of category (2) allow variations of skew angle, but for that purpose a cam must be changed for each variation. This requires that a set of cams be provided. However, the cams permit skew angles to be changed only in discrete steps. Also because the cams are complicated to manufacture and require precision machining, the tester becomes very expensive. Another disadvantage of the testers of category (2) is that their mechanisms have play in their links.

The tester of category (3) can provide a stepless variation, but at a sacrifice of simplicity of the mechanism, as the X-Y manipulator requires separate drives on X and Y axes and the use of complicated and expensive parts and units. Also the testing procedure is time-consuming, as it requires two step motors to move the head in two directions.

OBJECTS AND ADVANTAGES OF THE INVENTION

It is therefore an object of the invention to eliminate the above disadvantages and to provide a magnetic head and disc tester which is simple in construction, reliable in operation, and universal in application. Other advantages and features of the invention will become apparent from a consideration of the ensuing description and drawings.

REFERENCE NUMERALS USED IN THE SPECIFICATION AND DRAWINGS

10—housing
12—rotating spindle
14—disc
16—arm
18—magnetic head
20—magnetic head and disc tester
22—base plate
24—slide mechanism
26—stepper motor
28—output shaft
30—lead screw
32—bearings
34—nut
36—linear slide
38—clamp
40—guide
42—spindle mechanism
44—pivot pin
46—arm
48—front arm portion
50—rear arm portion
52—magnetic head
54—pointer
56—angular scale
58—dial indicator
60—screw
62—measurer
ID—inner track
OD—outer track
$A_{ID}$—skew angle on the inner track $A_{OD}$—skew angle of the outer track
$R_{ID}$—inner-track radius
$R_{OD}$—outer-track radius
X—line parallel to movement of the slide
B—parallel line passing through the center of pivot
M—parallel line passing through the center of the magnetic head
R—reference plane
L—distance between lines A and B
P—pivot point center
D—magnetic disc
O—center of disc rotation

FIGS. 2 AND 3—DESCRIPTION OF THE MAGNETIC HEAD AND DISC TESTER

Figure 1:
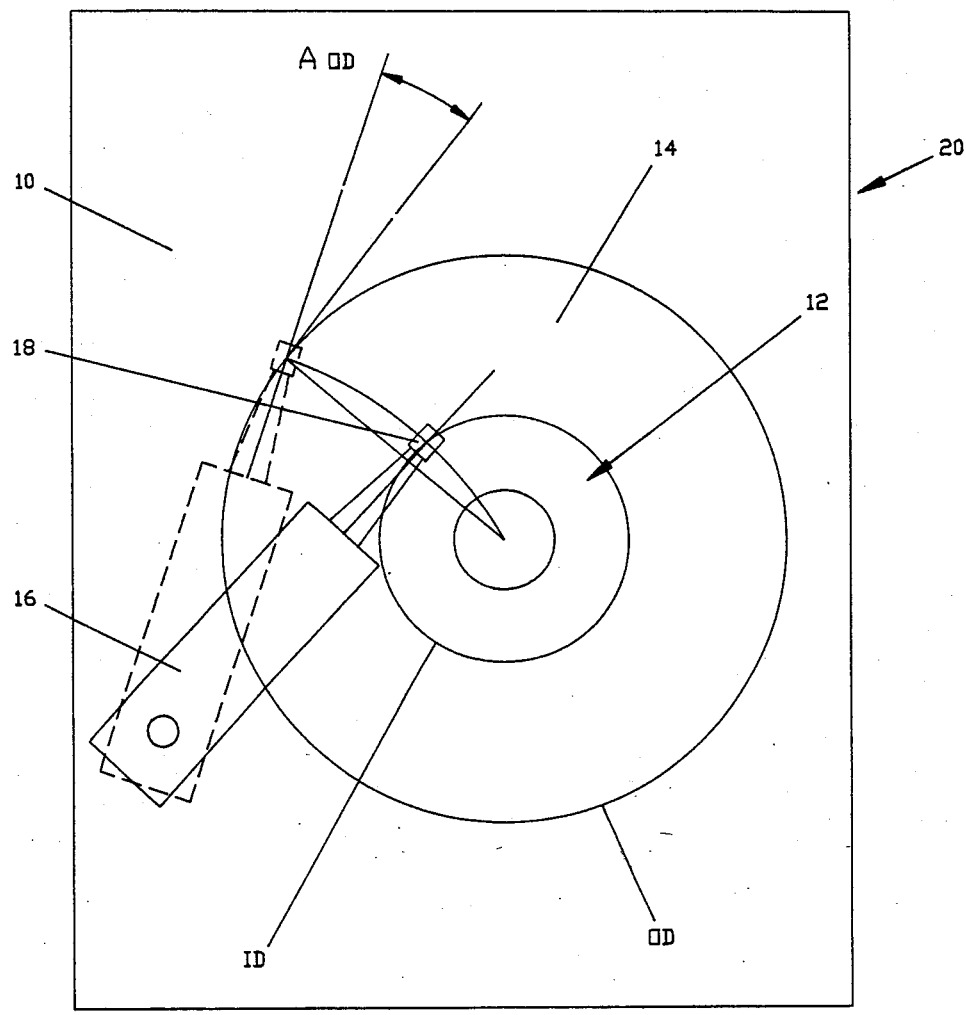
FIG. 1 is a schematic representation of a prior-art magnetic head and disc tester.
Figure 2:
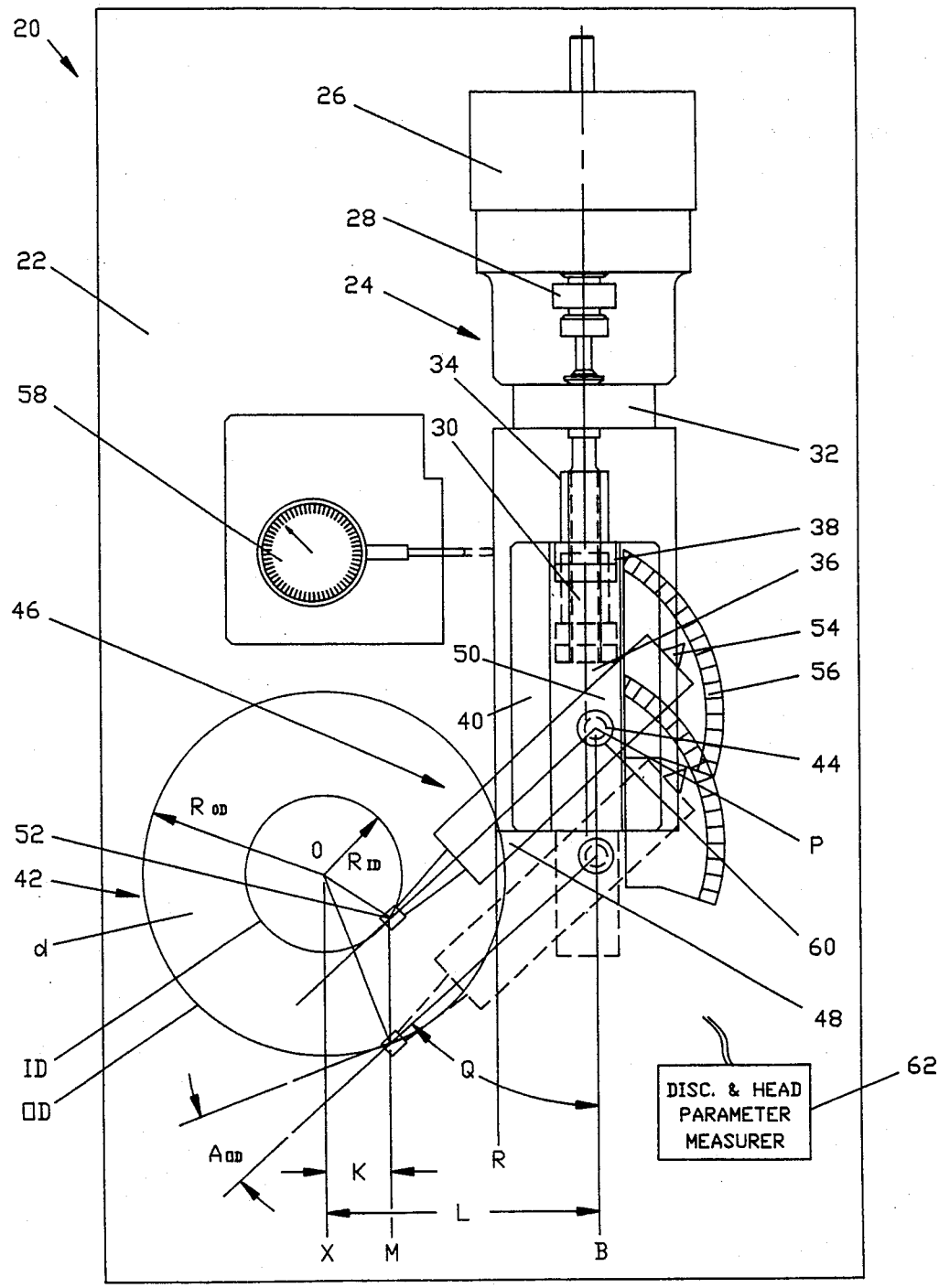
FIG. 2 is a plan view of a tester of the invention.

FIG. 2 is a plan view of a magnetic head and disc tester 20' of the invention.

Tester 20 has a stationary base plate 22 which supports a slide mechanism 24. Slide mechanism 24 can be fixed on plate 22 in any required position, e.g., by conventional T-slots and bolts (not shown).

Slide mechanism 24 comprises a stepper motor 26, an output shaft 28 of which is connected to a coaxially-arranged lead screw 30 which rotates in bearings 32. Lead screw 30 engages a nut 34 which is rigidly fixed to a linear slide 36 by means of a clamp 38, so that nut 34, clamp 38 and slide 36 form a rigid unit. Slide 36 slides along a guide 40 formed on mechanism 24.

When output shaft 28 of stepper motor 26 rotates, this rotation is converted through nut-and-screw engagement into translatory motion of slide 36.

Plate 22 also removably supports a conventional spindle mechanism (not shown) which can be fixed to the plate in any required position (e.g., by means of T-slots and bolts) and which contains a conventional rotary drive unit, a spindle, and a disc holder (also not shown). The purpose of this mechanism is to support and rotate magnetic disc d accurately around center O.

Slide 36 supports a pivot pin 44 which has a center P as a fulcrum point for an arm 46. Pivot pin 44 is located in an intermediate location on arm 46, so that it divides arm 46 into a front arm portion 48 and a rear arm portion 50. Front portion 48 carries a magnetic head 52 which is rigidly fixed to the arm. Rear portion 50 has a pointer 54 which, when arm 46 rotates on pivot pin 44, moves with respect to an angular scale 56 fixed to slide 36. The scale is graduated in degrees.

Distance L is the dimension between two lines X and B which are parallel to the movement of slide 36 and pass through centers O and P, respectively. Distance L can be accurately set by loosening the clamping bolts (not shown) of slide mechanism 24 and adjusting the position of a referance plane R provided on slide mechanism 24 with respect to a dial indicator 58. After completion of the adjustment, slide mechanism 24 is fixed to base plate 22 by the clamping bolts.

The angular position of arm 46 (and hence the longitudinal axis of head 52) with respect to line B is adjusted by means of pointer 54 and scale 56 and is fixed by a screw 60 which is threaded into a tapped hole (not shown) formed in the center of pivot pin 44. The angle between line B and arm 46 is designated as angle Q.

FIGS. 2 AND 3—OPERATION

Let us assume that a disc manufacturer has to adjust the tester for given new input data, i.e., $A_{ID}$, $A_{OD}$, and radii $R_{ID}$ and $R_{OD}$ of the inner and outer tracks of magnetic disc D, respectively.

At first, angle Q and distance L are determined from the above-mentioned input data by a simple geometrical calculation. This can be done manually, by using a simple program, or with graphs. After determining angle Q and distance L, which may be called output data, slide mechanism 24 is positioned on stationary plate 22 with the aid of dial indicator 58 and reference plane R, so that the required distance L is obtained.

Those skilled in the art will understand that distance L is used only because it can be easily calculated from the results of measurement of a distance from reference plane R to line X. What in fact is to be determined is a distance K between line X and line M which is parallel to line B and passes through the center of head 52. In fact, line M is the path of head 52 in the course of testing. Distance K can be measured and calculated by other suitable means.

Slide mechanism 24 is then locked to plate 22 by fixing the clamping bolts (not shown).

The next adjustment relates to angle Q and is set by loosening screw 60 and rotating arm 46 on its pivot pin 44 with respect to angular scale 56. Once angle Q is set, the position of arm 46 is fixed by tightening screw 60. Now the tester is automatically set for the required input data ($A_{ID}$, $A_{OD}$, $R_{ID}$, and $R_{OD}$). When slide 36 moves linearly in guide 40 and carries head 52 across disc D from inner track ID to outer track OD, this movement will simulate the motion of the magnetic head on a disk drive (not shown), albeit with some error.

This error will now be considered in some detail. It will be shown that in measuring the parameters of a magnetic disc or a head, this error is small enough to be neglected.

FIG. 3—SKEW ANGLE AND RADIUS

Figure 3:
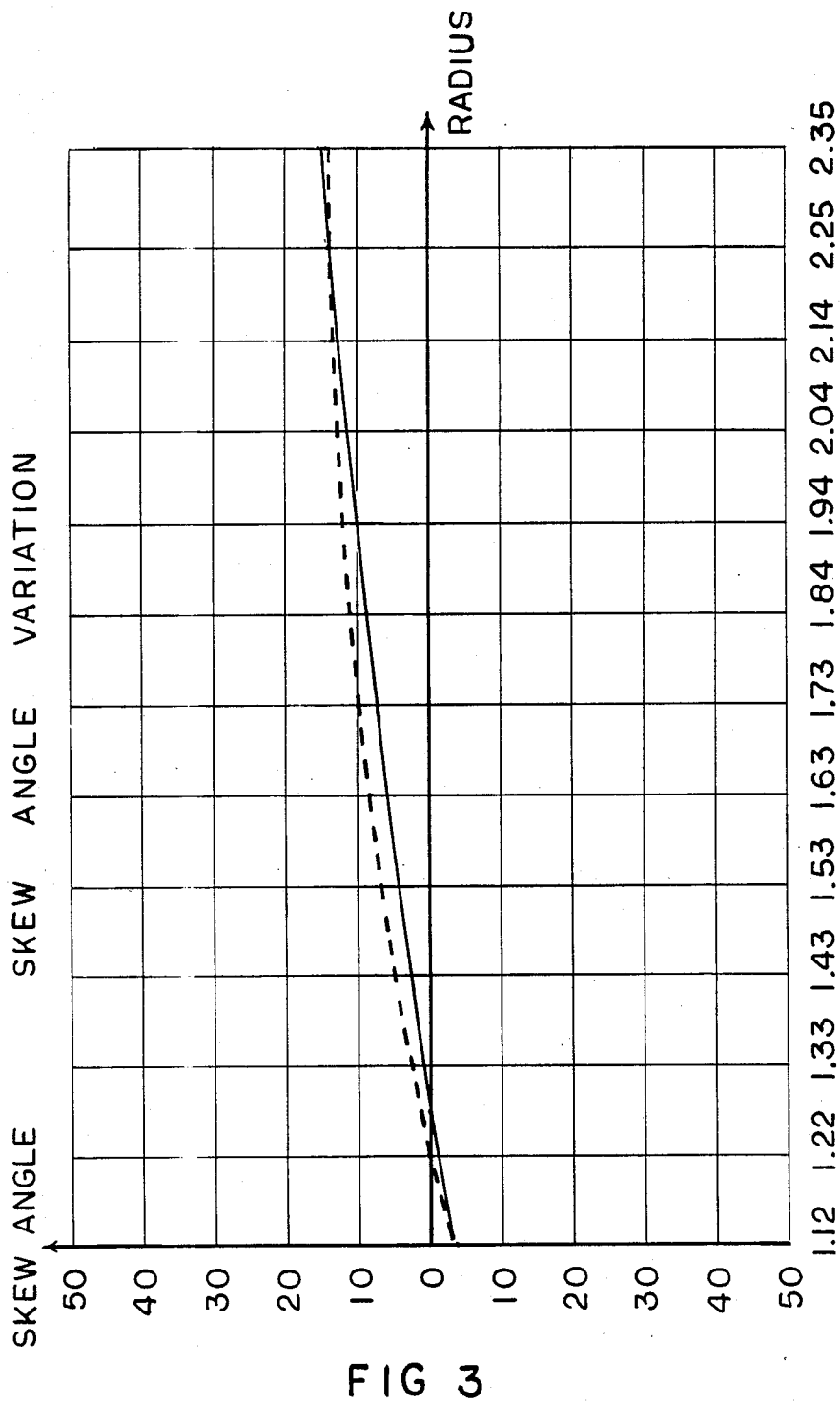
FIG. 3 is a graph which shows a relationship between a skew angle and a radius of measurement point.

FIG. 3 shows the relationship between the skew angle and radius of the disc. The solid-line corresponds to the variation of the skew angle in a disc drive (the measurements were obtained on a disk drive unit, Mod. XT 8380, manufactured by Maxtor Corporation of California). In this disc drive the movement of the magnetic head follows a circular path between the inner and outer tracks. The broken line corresponds to the variation of the skew angle on the head tester of the present invention in which the head follows a linear path; skew angles $A_{ID}$ and $A_{OD}$ correspond to those on disk drive.

The tester whose parameters are illustrated in FIG. 3 had the following specific characteristics: $R_{ID}=28.45$ mm (1.120″), $R_{OD}=59.69$ mm (2.350″); $A_{ID}=3.050°$; and $A_{OD}=15.400°$. It can be seen from FIG. 3 that an error introduced by the approximation method of the invention is less than 3°; this is negligible for practical purposes. But even this error can be halved by selecting the angle at which the curve will assume an intermediate position between the solid and broken lines in FIG. 3. It is understood that the above calculations are given only by way of example and that the invention is not limited to the illustrated case.

As the head is moved from track ID to track OD (or vice-versa) by the tester of the invention, the parameters of disc D or head 52 are measured in conventional fashion by a suitable measurer 62.

SUMMARY, RAMIFICATIONS, SCOPE

Thus the reader will see that at the expense of a minute and negligible error, the tester of the invention provides great simplicity of construction and operation, versatility, increased speed of use, and substantially reduced cost of manufacture. It accommodates a wide range of skew angles, it can be changed in continuous steps, it has no play in its linkage, and does not require two stepper motors.

Although the invention has been shown and described in the form of the specific embodiment, it is understood that this embodiment, its parts, materials and configurations were given only as examples, and that many other modifications of the magnetic head and disc tester are possible. The pivot point of arm 46 is shown in an intermediate position, but it also can be located at one of the arm's ends. While the arm is clamped in an adjusted angular position by screw 60, any other clamping means can be used for this purpose. Linear motion of the slide can be achieved by means other than a rotary stepper motor and screw-and-nut engagement, e.g., by means of a piston-and-cylinder unit, or another linear actuator. Distance L can be measured by an optical instrument and adjusted by moving spindle mechanism 42 instead of slide mechanism 24. While it is shown for use with a head and hard disc tester, it is applicable to any other similar type of mechanism which uses a spinning disk and a scanning or tracking head, such as testers for phonographs, CDs, floppy discs, etc.

Therefore the scope of the invention should be determined, not by the example given, but by the appended claims and their legal equivalents.

What we claim is:

1. A method of moving a magnetic read-write head across a magnetic disc so that said head and said disc can be tested electrically, said head having a longitudinal axis and said magnetic disc having a plurality of concentric circular magnetic tracks thereon, said method comprising:
   rotatingly supporting said disc on a stationary base;
   installing said head on a pivotable arm,
   mounting said arm on a slide which is linearly movable in a given direction;
   positioning said arm at an angle to said direction of movement of said slide so that said longitudinal axis of said head defines a predetermined angle with a tangent of a predetermined one of said circular tracks on said disc, and
   moving said slide in said given direction so that said head traverses said tracks of said disc.

2. The method of claim 1 wherein slide is moved so that said magnetic head traverses said magnetic disc between an inner track and an outer track of said disc.

3. The method of claim 1 wherein the position of said slide is adjustable with respect to a center of rotation of said disc, and wherein output data for adjustment of said slide are calculated on the basis of input data derived from a disc drive, movements of which are simulated on said disc tester by measuring a distance from a line parallel to the direction of said slide and a parallel line which passes through said center of rotation of said disc, and an angle between the longitudinal axis of said magnetic head and said direction of movement of said slide.

4. The method of claim 3 where said input data includes a radius of an outer track on said disc, a radius of an inner track on said disc, an angle between a tangent to a point on said inner track and the longitudinal direction of said magnetic head, and an angle between a tangent to a measuring point on said outer track and the longitudinal direction of said magentic head.

5. A magnetic disc and head tester for moving a magnetic head having a longitudinal axis across a magnetic disc having concentric tracks, including an outer track and an inner track, said tester comprising:
   a stationary base and means on said base for supporting and rotating said magnetic disc;
   means for moving said magnetic head linearly with respect to said magnetic disc;
   means, on said means for moving said magnetic head linearly, for moving said magnetic head in an arc which is parallel to said magnetic disc and which traverses said tracks of said disc,
   means for measuring the angular position of said longitudinal axis of said magnetic head with respect to a tangent to a given one of said tracks on said disc; and
   means for measuring a parameter of one of said magnetic head and said magnetic disc when said magnetic head is moved by said means for moving said head linearly with respect to and disc.

6. The tester of claim 5 wherein said means for moving said magnetic head linearly with respect to said magnetic disc comprises a slide mechanism fixed to said stationary base, and said means for moving said magnetic head in an arc comprises an arm pivotally installed on said slide mechanism.

7. The tester of claim 6 wherein said slide mechanism comprises a guide, a slide linearly moveable in said guide, and a drive unit for moving said slide.

8. The tester of claim 7 wherein said drive unit for moving said slide comprises a stepper motor installed on said slide mechanism and having an output shaft connected to a lead screw, and a nut attached to said slide mechanism and engaging said lead screw, such that rotation of said stepper motor is converted through the engagement of said lead screw and said nut into said linear motion of said slide.

9. The tester of claim 6 wherein said arm carries a pointer and said slide mechanism supports an angular scale, said slide mechanism having means for locking said arm in an adjusted angular position.

10. The tester of claim 6 wherein said slide mechanism has means for adjusting its position with respect to said magnetic disc.

11. The tester of claim 10 wherein said adjusting means comprises a reference plane on said slide mechanism, a measuring instrument for measuring a distance between said reference plane and the center of rotation of said magnetic disc, and means for clamping said slide mechanism to said stationary plate in an adjusted position.

12. A magnetic disc and head tester for testing parameters of a magnetic head having a longitudinal axis and a magnetic disc having concentric tracks between an outer track and an inner track thereof, comprising:
   a stationary base;
   a slide mechanism fixed to said stationary base;
   a slide linearly moveable in said slide mechanism;
   means for linearly moving said slide in said slide mechanism;
   an arm pivotally installed on said slide and carrying said magnetic head, such that said magnetic head is positioned over one of said tracks of said disc, and such that said longitudinal axis of said magnetic head makes an angle with a tangent to said one track on said disc;
   an angular scale on said slide mechanism and a pointer on said arm for measuring said angle between said longitudinal axis of said magnetic head and said tangent to said one track on said disc; and means for measuring a parameter of at least one of said magnetic head and said magnetic disc when said magnetic head is moved by said means for linearly moving said slide mechanism with respect to said disc.

13. The tester of claim 12 wherein said means for linearly moving said slide comprises a stepper motor installed on said slide mechanism and having an output shaft connected to a lead screw, and a nut attached to said slide and engaging said lead screw, such that rotation of said stepper motor is converted through said engagement into said linear motion of said slide.

14. The tester of claim 12 wherein said slide mechanism has means for locking said arm in an adjusted angular position.

15. The tester of claim 12 said slide mechanism has means for adjusting its position with respect to said magnetic disc.

16. The tester of claim 15 wherein said adjusting means comprises a reference plane on said slide mechanism, a measuring instrument for measuring a distance between said reference plane and a center of rotation of said magnetic disc, and means for clamping said slide mechanism to said stationary plate in an adjusted position.

17. A magnetic head tester for testing the parameters of a magnetic head having a longitudinal axis and a magnetic disc having concentric tracks between an outer track and an inner track on said disc, comprising:
a stationary base;
linear movement means for moving said magnetic head linearly with respect to said magnetic disc;
arc means for moving said magnetic head in an arc across said tracks on said disc, said arc means being mounted on said linear movement means;
angle means for measuring an angular position of said longitudinal axis of said magnetic head with respect to a tangent to a given track on said disc;
measuring means for measuring a parameter of one of said magnetic head and said magnetic disc when said magnetic head is moved by said linear movement means, said linear movement means comprising a slide mechanism fixed to said stationary base, and said arc means comprising an arm pivotally installed on said slide mechanism, said slide mechanism comprising a guide, a slide linearly moveable in said guide, and a drive unit for side movement of said slide, said drive unit comprising a stepper motor installed on said slide mechanism and having an output shaft connected to a lead screw, and a nut attached to said slide and engaging said lead screw, so that rotation of said stepper motor is converted through said engagement into said linear motion of said slide.

18. The tester of claim 17 wherein said arm carriers a pointer and said slide mechanism supports an angular scale, said slide mechanism having means for locking said arm in an adjusted angular position.

19. The tester of claim 17 wherein said slide mechanism has means for adjusting its position with respect to said magnetic disc.

20. The tester of claim 19 wherein said adjusting means comprises a reference plane on said slide mechanism, a measuring instrument for measuring a distance between said reference plane and the center of rotation of said magnetic disc, and means for clamping said slide mechanism to said stationary plate in an adjusted position.

* * * * *